2,788,373

ETHYLENE GLYCOL PURIFICATION

Edward J. Mills, Jr., Charleston, and Donald G. Leis, St. Albans, W. Va., assignors to Union Carbide and Carbon Corporation, a corporation of New York No Drawing. Application May 12, 1953,
Serial No. 354,637

6 Claims. (Cl. 260—637)

This invention relates to a process for removing impurities present in ethylene glycol recovered in the course of producing polymeric esters of ethylene glycol and terephthalic acid.

Polymeric terephthalate esters can be prepared either by direct esterification of terephthalic acid and ethylene glycol, or by ester interchange as by heating ethylene glycol with a lower monohydric alcohol ester of the acid, for example, dimethyl terephthalate. In either process ethylene glycol is usually present in excess of theoretical combining proportions to facilitate reaction of substantially all the terephthalic acid in the reaction mixture. Part of the excess ethylene glycol may be distilled off during the reaction. In any event, upon completion of the reaction, practically all the excess ethylene glycol is then removed from the polyester by procedures such as washing with water, by distillation or by combination of these methods.

The recovered ethylene glycol is generally contaminated with small amounts of water, alkaline salts of terephthalic acid such as sodium terephthalate, and alkali hydroxides, such as sodium hydroxide. Other impurities that may be present include trace amounts of monohydric alcohols such as methyl alcohol when the polyester has been made by the ester interchange process. Other possible impurities include ethylene glycol reaction products such as low-molecular weight ethylene glycol esters of terephthalic acid and low molecular weight aldehydes and acetals which are formed as decomposition products when ethylene glycol is heated in the presence of a strong base.

The presence of alkaline terephthalate salts and alkaline hydroxides in the recovered ethylene glycol is in some instances due to the use of alkali or alkaline earth metals or their methoxides as catalysts in the esterification reaction. The use of such catalysts and the washing of the ethylene glycol terephthalate polymers with water are described in British Patent No. 578,079.

The recovered ethylene glycol, containing some or all the aforementioned contaminants is highly colored, usually of a deep reddish brown color, but is normally free from suspended solid matter. While the ethylene glycol in this contaminated state could be again used for esterification of terephthalic acid, the resultant polyesters are of such poor color and quality as to render them unsuitable for synthetic fiber production, a highly important use presently for these polyesters.

The contaminated ethylene glycol upon test was also found to be too corrosive on metals, such as iron, copper, lead, brass and aluminum for use as an anti-freeze liquid in automotive and other liquid cooling systems.

Separation of the soluble solid matter in the contaminated ethylene glycol such as the terephthalate salts can be effected by distillation at low pressures, 5–10 mm. Hg and at kettle temperatures between 100°–189° C., but this process is inefficient due to the fact that considerable solid separation occurs after approximately 60 percent of the charge has been distilled over. The separated solids deposit on the heating surfaces of the still and adversely affect the thermal efficiency of the still. Moreover, considerable decomposition of the ethylene glycol takes place at this point. This decomposition is probably caused by the heating of ethylene glycol in the presence of strong bases such as an alkali metal hydroxide, or the salt of an alkali metal and a relatively weak acid such as terephthalic acid. This is the same type of decomposition noted previously.

It has now been found that contaminated ethylene glycol which has been recovered in the production of ethylene glycol terephthalate polyesters can be refined to a commercially acceptable product and with high yields by first diluting the contaminated ethylene glycol with water, and rendering the resultant aqueous solution sufficiently acidic by the addition of a suitable mineral acid such as hydrochloric acid, orthophosphoric acid or sulphuric acid to effect a precipitation of the soluble solid matter in the crude ethylene glycol, the solid matter being principally terephthalate salts which usually precipitate out as free terephthalic acid. The precipitated solid matter is removed from the aqueous ethylene glycol solution as by decantation or by filtration which can include the use of conventional filtering agents such as diatomaceous earth and the like to further improve the filtering efficiency. The solid-free aqueous ethylene glycol solution is then partially dehydrated preferably while being maintained under acidic conditions in order to hydrolize ethylene glycol acetal impurities and various other condensation products such as acetals, hemiacetals, aldol type polymers and low molecular weight terephthalate esters to materials readily separated from ethylene glycol as by azeotropic distillation with water or by fractionation. Upon a major amount of the water having been removed by distillation, the acidic ethylene glycol is then neutralized with an alkali, as for example with sodium hydroxide to impart a substantially neutral pH. The neutralized ethylene glycol is then refined by vacuum distillation. The resultant distilled ethylene glycol is equivalent to ethylene glycol normally offered to the trade as regards color, odor, acidity, water-miscibility, and boiling range.

The step of acidifying to precipitate out soluble solid matter, such as the terephthalate salts from the contaminated ethylene glycol can be satisfactorily effected at practically any dilution ratio of ethylene glycol to water. No physical differences were noted for precipitations carried out at ethylene glycol to water ratios (by weight) of 4:1, 2:1, 1:1, 1:1.5 and 1:2. However, certain practical considerations favor the use of minimum amounts of diluting water, not only from the economic consideration of having less water to remove in the dehydration step, but also in that the use of lower water ratios was found effective in producing a final refined product of higher purity and in greater yield.

By means of potentiometric titrations it was determined that with all of the aforementioned water-dilution ratios complete precipitation was had of the terephthalate salts (precipitated as free terephthalic acid), providing the aqueous solutions had been sufficiently acidified to impart a pH value of 2 or less. On the other hand, it was found that more of the inorganic salts such as were originally present in the contaminated glycol and that which are formed upon acidification would precipitate out at this stage when using minimum amounts of water to dilute the ethylene glycol.

For example, a recovered ethylene glycol contaminated with sodium terephthalate salts when diluted with water and sufficiently acidified with sulphuric acid precipitates out all the free terephthalic acid, but only part of the sodium hydrogen sulphate which is formed. This inorganic salt is not appreciably soluble in an aqueous solvent comprising about 80 percent by weight of ethylene glycol, and only about 20 percent by weight of water, and consequently a considerable proportion of such inorganic salts are precipitated out of the solution. Acidified ethylene glycol solutions of higher water-content, however, retain more of the inorganic salts in solution and hence are present in the ethylene glycol during the dehydration step as acidic salts, e. g. sodium hydrogen sulfate. These acidic salts cause some decomposition of the ethylene glycol. Furthermore, the aqueous ethylene glycol solutions of high water content necessarily require more time to dehydrate, and it has been observed that poorer quality ethylene glycol is recovered whenever the dehydration step is prolonged.

Upon the partially dehydrated ethylene glycol being neutralized, a neutral salt is formed, e. g. disodium sulfate, and such salts are present in the still charge while the ethylene glycol is being distilled off and do not appear to affect the quality of the ethylene glycol obtained by distillation.

The presence of inorganic salts in the ethylene glycol during the dehydration and distillation steps for reasons not adequately known at present is believed a determining factor as to the degree of purity of the ethylene glycol ultimately obtained in the final distillation step. The impurities in the resultant distilled ethylene glycol constitute only trace amounts and are not readily identified either by quantitative or qualitative procedures of analysis, but are reflected in the ultraviolet transmission spectrum. Further, the presence and relative amount of such trace impurities in the distilled ethylene glycol can be observed with reference to the degree and rate of corrosion resulting from contact of aqueous solutions of the distilled ethylene glycol with metals commonly used in automotive cooling systems.

One form of accelerated test found useful for determining the potential corrosive properties of anti-freeze fluids such as aqueous solutions of ethylene glycol involves immersing metal strips of aluminum, iron, lead, copper and brass in such solutions for 200 hours at 71° C. while a stream of air is continuously discharged against the metal surfaces. The metal strips are then removed, dried and weighed to determine whatever loss in weight occurred under these conditions. By algebraically adding the losses for all the metal strips and calculating according to a formula, a simplified value is obtained, designated the "corrosion index." Anti-freeze liquids having a "corrosion index" of 20 or less according to this test are considered comparatively innocuous, whereas liquids exhibiting a higher "corrosion index" number e. g. 50 and higher are apt to cause such rapid corrosion and deterioration of metal surface as to require their replacement prior to the expiration of their normal expected life.

*Corrosion index test*

Clean and polish individual metal strips of aluminum, iron, lead, copper and brass conforming to the following dimensions: length, 45 mm.; width, 13 mm.; thickness, 2 mm.; total surface area, 2.1731 sq. in. Weigh each metal strip to the nearest 0.1 mg.

*Procedure*

Transfer 83 ml. of the sample to a 500-ml. Erlenmeyer flask fitted with a 24/40 ground-glass joint and containing a suitable ebullator connected to a source of compressed air.

Add 167 ml. of tap water and swirl to effect solution. Place the metal strips, in the order listed above, in the flask with the respective edges touching. Attach the flask to a 500-ml. water-cooled West condenser fitted with a 24/40 standard taper joint. Adjust the air ebullator so that the bubble discharge is approximately 20 mm. above the metallic surfaces. Maintain a rate of 2 bubbles per second. Heat the solution to 160° F. (71° C.) with an electric heater and permit the solution to reflux at that temperature for 200 hours. Remove the source of heat and allow to cool to room temperature. Remove the metal strips and scour each with mild soap to remove all encrusted corrosion products. Dry strips with acetone and air; place in a desiccator and reweigh to the nearest 0.1 mg.

*Calculations*

Calculate the inch-penetration rate per month of each strip.

$$\frac{W_b - W_a \times 43.9}{d \times A \times t} = \text{average penetration rate, inches per month}$$

$A$ = total surface area of strip, square inches
$d$ = density of strip, gm./ml.
$t$ = duration of test, hours
$W_a$ = weight of strip after corrosion, gm.
$W_b$ = weight of strip before corrosion, gm.

Determine the corrosion index of the sample by adding algebraically the penetration values in inches per month, I. P. M., of each strip and using the following table:

| Change in strip weight, penetration, I. P. M. | Index No. |
|---|---|
| Gain in weight | −1 |
| No change in weight | −1 |
| Loss in weight: | |
| 0.000001 to 0.000010 | +1 |
| 0.000010 to 0.000020 | +2 |
| 0.000020 to 0.000030 | +3 |
| 0.000040 to 0.000050 | +5 |
| 0.000090 to 0.00010 | +10 |
| 0.00014 to 0.00015 | +15 |
| 0.00019 to 0.00020 | +20 |
| 0.00049 to 0.00050 | +50 |
| 0.00090 to 0.00100 | +100 |

It has been found that by diluting contaminated ethylene glycols with a minimum amount of water, such as 10% to 50% by weight of the ethylene glycol content of the contaminated material and acidifying sufficiently to precipitate out all the organic salts, that ethylene glycol thus treated, can be dehydrated and then refined by distillation to yield a purified ethylene glycol having a "corrosion index" less than 20.

Sulphuric acid is the preferred acid both for the precipitation step and particularly for maintaining an acidic pH condition during dehydration of the aqueous ethylene glycol solution to effect hydrolysis of high boiling impurities to materials which are readily removable by azeotropic distillation with water. Hydrochloric acid is satisfactory for the precipitation step, but because its aqueous solution has a maximum boiling point of only 110° C. at atmospheric pressure, it is less effective than sulphuric acid for maintaining the desired acidic condition throughout the step of dehydrating the aqueous ethylene glycol solution. Phosphoric acid is also suitable for the precipitation step, and while it does not volatilize during the dehydration step, the recovered ethylene glycol is not as pure as that obtained from the use of sulphuric acid. Carbonic acid has not been found satisfactory for either the precipitation or dehydration steps.

In the step of dehydrating the aqueous ethylene glycol which has been freed of its content of alkaline terephthalate salts, by acidic precipitation, it has been found desirable to maintain the aqueous ethylene glycol solution at an acid pH value during the dehydration step. Acidic conditions have been found effective in decomposing high boiling organic impurities such as higher unsaturated and/or hydrated aldehydes derived from acetaldol or crotonaldehyde, aldol polymers, low-molecular weight linear esters of ethylene glycol and terephthalic acid and various acetals to lower boiling products such as methanol, acetaldehyde, crotonaldehyde, acetaldol, hexadienal and the like, which can then be azeotropically distilled off with the water.

After all or at least a major portion of the water has been distilled off, the acidic ethylene glycol is preferably neutralized to a pH value between 7.0 and 8.0 before any ethylene glycol is distilled off to prevent formation of dioxane and other impurities likely to distill over with the ethylene glycol. Distillation of acidic ethylene glycol without neutralization yields a distillate of higher "corrosion index" and poorer quality as evidenced by its ultraviolet transmission.

The invention is further exemplified in the following examples:

*Example 1*

A crude ethylene glycol recovered from the manufacture of ethylene glycol terephthalate polyester had the following compositions as determined by analysis:

| | Percent |
|---|---|
| Ethylene glycol | 93.5 |
| Water | 2.0 |
| Disodium terephthalate | 2.4 |
| Sodium hydroxide | 0.05 |
| Acetals (calculated as diethylacetal) | 0.05 |
| Unidentified solid matter | 0.06 |
| | 99.05 |

| | |
|---|---|
| Color | Deep, reddish brown |
| Specific gravity at 20° C. | 1.1280 |

Standard distillation at 760 mm. Hg:

| | ° C. |
|---|---|
| Initial boiling point | 170.5 |
| 50 ml. | 181.1 |
| 97 ml. | 195.6 |

A 1000-gram charge of the crude ethylene glycol was mixed with 250 grams of water and sufficient sulphuric acid to impart an acidic value of pH 2. The acidified mixture was stirred for 30–60 minutes and then allowed to stand for 24 hours. Thereafter the acidified charge was filtered through a thin pad of diatomaceous earth filter, such as "Filter Cel" to remove precipitated solid matter including free terephthalic acid. A one-liter kettle equipped with a thermometer, a 30-tray (equivalent to 24 theoretical plates) "Oldershaw" column with an automatic distillation head and suitable receiver was charged with the filtrate. Distillation at atmospheric pressure was initiated and continued until about 80% (200 grams) of the total water content had distilled over, a maximum kettle temperature of 180° C. being reached during this step. The contents of the kettle were then cooled to room temperature and the charge neutralized to a pH value between 7.5 and 8.0 by the addition of a sufficient amount of a 50 percent aqueous sodium hydroxide solution. Cooling of the charge facilitated measurement of the pH value at 20° C., but neutralization may be carried out at kettle temperatures of up to 180° C. without harm. The neutralized material was again heated to a distilling temperature under 300 mm. Hg pressure. The distillate coming over was collected in two fractions; the first being a mid fraction (81 grams) of products distilling over up to a vapor temperature of 166° C. at 300 mm. Hg pressure, this portion containing principally water and 30.4 grams ethylene glycol. The second fraction or product cut distilled over at a vapor temperature range of 166–168° C. at 300 mm. Hg pressure and consisted of substantially pure ethylene glycol, amounting in all to 819 grams, this being equivalent to 87.6% of the total ethylene glycol present in the original charge. The still residue amounted to 49 grams. Of the total content of ethylene glycol present in the original charge, 87.6% was recovered in the product cut. The product cut ethylene glycol had a specific gravity at 20°/20° C. of 1.1150; 0.003% acidity as acetic acid; a water-content of 0.39%; a platinum cobalt color of 5 by the APHA test as described in "Standard Methods for the Examination of Water and Sewage," 9th edition (1946), pages 14–15, published jointly by the American Public Health Commission and the American Water Works Association; and distilled completely at 760 mm. Hg pressure between 193.3° C. and 199.9° C. (vapor temperatures) and exhibited a "corrosion index" value of 7.

*Example 2*

A 1000 gram charge of the same crude ethylene glycol described in Example 1 was diluted with 1000 grams water and then acidified with 41.0 grams of 50 percent aqueous sulphuric acid causing precipitation of all the sodium terephthalate present in the crude ethylene glycol. The precipitated matter was removed by filtration of the acidified charge through a bed of "Filter Cel" and the resultant filtrate was partially dehydrated by heating at atmospheric pressure in a still as described in Example 1 to a kettle temperature of 165° C. until 879 grams of water were removed. The contents of the still were cooled to room temperature and neutralized with sufficient 50 percent aqueous sodium hydroxide to impart a pH value of 7.5. The neutralized charge was stripped of the remaining water by distillation at 300 mm. Hg pressure to a vapor temperature of 166° C., yielding an aqueous mid fraction amounting to a total of 87 grams and containing 17.3 grams ethylene glycol. The next or product cut fraction distilled over at a vapor temperature of 166–168° C. at 300 mm. Hg pressure consisted of 776 grams of substantially pure ethylene glycol, this being equivalent to 83 percent of the total ethylene glycol in the charge. The residue in the still amounted to 58 grams. The product cut ethylene glycol had a specific gravity at 20/20° C. of 1.1150; 0.002% acidity calculated as acetic acid; a water content of 0.078%; a platinum-cobalt color of 8; distilled completely at 760 mm. Hg pressure between 190.5° C. and 197.5° C. (vapor temperatures); and had a "corrosion index" value of 68.

*Example 3*

A 1000 gram charge of the same crude ethylene glycol described in Example 1, was diluted with 2000 grams water and then acidified with 41.0 grams of 50 percent aqueous sulphuric acid causing precipitation of all the sodium terephthalate present in the crude ethylene glycol. The precipitated matter was removed by filtration of the acidified charge through a bed of "Filter Cel" and the resultant filtrate was partially dehydrated by heating at atmospheric pressure in a still as described in Example 1 to a kettle temperature of 180° C. until 1891 grams of water had been stripped off. The contents of the still were then cooled to room temperature and neutralized with sufficient 50 percent aqueous sodium hydroxide solution to establish a pH value of 7.5. The neutralized charge was then heated at 300 mm. Hg pressure to a vapor temperature of 166° C. while distilling off an aqueous mid fraction amounting to a total of 56 grams and containing 22.2 grams ethylene glycol. The next or product cut fraction distilled over at a vapor temperature between 166° and 168° C. at 300 mm. Hg pressure and consisted of 744 grams of substantially pure ethylene glycol, this being equivalent to 79.6 percent of the ethylene glycol content in the original charge. The still residues amounted to 135 grams. The product cut ethylene glycol had a specific gravity at 20/20° C. of 1.1144; 0.005% acidity calculated as acetic acid; a water-content of 0.07%; a platinum-cobalt color of 15; distilled completely at 760 mm. Hg pressure between 184.5° and 199.1° C. (vapor temperatures); and had a "corrosion index" value of 86.

*Example 4*

A 1200 gram charge of the crude ethylene glycol as described in Example 1 was diluted with 300 grams of water, and then acidified with 105 grams of 85 percent phosphoric acid added slowly with stirring, causing precipitation of all the sodium terephthalate present in the crude ethylene glycol. After 24 hours standing the precipitated solids were removed by filtration of the acidified charge through a filter aid, such as "Filter Cel," leaving 1339 grams of clear solution. The resultant filtrate was partially dehydrated by heating at atmospheric pressure in a still as described in Example 1 to a kettle temperature of 180° C. until 264 grams of water had been removed. The contents of the still were cooled to room temperature and neutralized with sufficient 50° aqueous sodium hydroxide to impart a pH value of 7. The neutralized charge was stripped of the remaining water by distillation at 300 mm. Hg pressure to a vapor temperature of 166° C., yielding an aqueous mid fraction amounting to 102 grams composed principally of water and some ethylene glycol. The second fraction or product cut distilled over at a vapor temperature range of 166–168° C. at 300 mm. Hg pressure and consisted of substantially pure ethylene glycol amounting in all to 727 grams, this being equivalent to 66.6% of the ethylene glycol in the original charge. The still residue was 173 grams and was composed of ethylene glycol and various heavy ends. The product cut ethylene glycol had a specific gravity of 1.1151 at 20/20° C., showed an ASTM standard distillation range of 195.5 to 196.7° C., contained 0.15 percent water and had an acidity of 0.004 percent as acetic acid and a platinum cobalt color of 20. The "corrosion index" value of the recovered ethylene glycol was 134.

Inspection of the data in these examples shows that by using sulphuric acid as the preferred acidifying agent, and relatively small amounts of diluting water in the acidification step such as in Example 1, namely a ratio of 4 parts ethylene glycol to 1 part water, that in the subsequent steps, a higher yield of ethylene glycol is recovered in the product fraction, and this ethylene glycol is of higher purity as evidenced by its lighter color, narrower boiling range, lower residual acidity and "corrosion index" than the ethylene glycol recovered by the use of higher ratios of water to ethylene glycol as exemplified by the 1:1 ethylene glycol-water ratio of Example 2, and the still higher 1:2 ethylene glycol-water dilution of Example 3.

The ethylene glycol recovered according to the process of Example 1 is completely satisfactory for use as anti-freeze liquid due to its low "corrosion index" value and for many other uses requiring substantially pure ethylene glycol. While the recovered ethylene glycol of Examples 2 and 3 exhibit a considerably higher "corrosion index" value and thus not qualifying as top quality anti-freeze liquids, nevertheless they are sufficiently pure for such uses as reaction intermediates in the formation of esters.

What is claimed is:

1. Process for purifying ethylene glycol contaminated with an alkaline terephthalate salt, aldehyde polymer and ethylene glycol reaction products which comprises diluting the contaminated ethylene glycol with water, acidifying the aqueous ethylene glycol solution with a sufficient amount of a mineral acid selected from the group consisting of sulphuric acid, phosphoric acid, and hydrochloric acid to precipitate out soluble solid matter including the alkaline terephthalate salt as free terephthalic acid, removing the precipitated solid matter from the acidified aqueous ethylene glycol solution, substantially dehydrating the precipitate-free, aqueous ethylene glycol solution while maintained under acidic conditions to hydrolize high boiling acetal impurities to lower boiling materials which distill azeotropically with water, neutralizing the dehydrated ethylene glycol and distilling the neutralized ethylene glycol.

2. Process for purifying ethylene glycol contaminated with an alkaline terephthalate salt which comprises diluting the contaminated ethylene glycol with water to form a solution of substantially 4 parts ethylene glycol to one part water by weight, acidifying the solution with a mineral acid selected from the group consisting of sulphuric acid, phosphoric acid, and hydrochloric acid to a pH value of about 2 to precipitate out of solution the alkaline terephthalate salts in the form of free terephthalic acid, removing the precipitated terephathlic acid and any other precipitated solid matter from the acidified aqueous ethylene glycol solution, distilling off substantially all the water in the precipitate-free, acidic aqueous ethylene glycol solution, neutralizing the dehydrated ethylene glycol to a pH value between 7.0 and 8.0 and then distilling the neutralized ethylene glycol.

3. Process for purifying ethylene glycol contaminated with an alkaline terephthalate salt, which comprises diluting ethylene glycol containing an alkaline terephthalate salt with water in a ratio of one part by weight of ethylene glycol to between 0.1 and 0.5 part water, acidifying the aqueous solution with a sufficient amount of sulphuric acid to cause precipitation of the alkaline terephthalate salt as free terephthalic acid then removing the precipitated terephthalic acid from the acidified aqueous ethylene glycol, substantially dehydrating the precipitate-free aqueous ethylene glycol solution while maintained under acidic conditions, neutralizing the dehydrated ethylene glycol and distilling the neutralized ethylene glycol.

4. Process for purifying ethylene glycol contaminated with impurities including acetals of ethylene glycol which can be hydrolized to products capable of being separated from the ethylene glycol by azeotropic distillation with water, which comprises diluting the contaminated ethylene glycol with water, acidifying the aqueous ethylene glycol solution with a mineral acid which is substantially non-volatile at distillation temperatures up to the boiling point of ethylene glycol selected from the group consisting of sulphuric acid, phosphoric acid, and hydrochloric acid, and then substantially dehydrating the acidified aqueous ethylene glycol solution, neutralizing the dehydrated ethylene glycol and distilling the neutralized ethylene glycol.

5. Process for purifying ethylene glycol contaminated with an alkaline terephthalate salt, aldehyde polymer and ethylene glycol reaction products which comprises diluting the contaminated ethylene glycol with water in amount between 10 and 50 percent by weight of the ethylene glycol, acidifying the aqueous ethylene glycol solution with a sufficient amount of a mineral acid selected from the group consisting of sulphuric acid, phosphoric acid, and hydrochloric acid to precipitate out soluble solid matter including the alkaline terephthalate salt as free terephthalic acid, removing the precipitated solid matter from the acidified aqueous ethylene glycol solution, substantially dehydrating the precipitate-free, aqueous ethylene glycol solution, while maintained under acidic conditions to hydrolize high boiling acetal impurities to lower boiling materials which distill azeotropically with water, neutralizing the dehydrated ethylene glycol and distilling the neutralized ethylene glycol.

6. Process for purifying ethylene glycol contaminated with an alkaline terephthalate salt which comprises diluting the contaminated ethylene glycol with water to form a solution of substantially 4 parts ethylene glycol to one part water by weight, acidifying the solution with a mineral acid selected from the group consisting of sulphuric acid, phosphoric acid, and hydrochloric acid to a pH value of about 2 to precipitate out of solution the alkaline terephthalate salts in the form of free terephthalic acid, removing the precipitated terephthalic acid and any other precipitated solid matter from the acidified aqueous ethylene glycol solution, distilling off substantially all the water in the precipitate-free, acidic aqueous ethylene glycol solution, neutralizing the dehydrated ethylene glycol to a pH value between 7.0 and 8.0 and then distilling the neutralized ethylene glycol.

References Cited in the file of this patent

UNITED STATES PATENTS

| | | |
|---|---|---|
| 1,344,850 | Bassett | June 29, 1920 |
| 2,400,859 | Wallerstein et al. | May 21, 1946 |

FOREIGN PATENTS

| | | |
|---|---|---|
| 578,079 | Great Britain | June 14, 1946 |
| 134,866 | Australia | May 8, 1947 |